United States Patent
Lee et al.

(10) Patent No.: US 8,429,520 B2
(45) Date of Patent: Apr. 23, 2013

(54) CITATION RECORD EXTRACTION SYSTEM AND METHOD

(75) Inventors: Hahn-Ming Lee, Taipei (TW); Jan-Ming Ho, Taipei (TW); Shui-Shi Chen, Taipei (TW); Kai-Hsiang Yang, Taipei (TW); Ruei-Yuan Wang, Taipei (TW); Jerome Yeh, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 386 days.

(21) Appl. No.: 12/834,757

(22) Filed: Jul. 12, 2010

(65) Prior Publication Data

US 2011/0029528 A1   Feb. 3, 2011

(30) Foreign Application Priority Data

Aug. 3, 2009   (TW) .............................. 98126042 A

(51) Int. Cl.
  *G06F 17/20*   (2006.01)
  *G06F 17/21*   (2006.01)
  *G06F 17/22*   (2006.01)
  *G06F 17/24*   (2006.01)

(52) U.S. Cl.
  USPC ............................ 715/234; 715/254; 715/255

(58) Field of Classification Search .................. 715/234, 715/254, 255
  See application file for complete search history.

(56) References Cited

U.S. PATENT DOCUMENTS

| | | | |
|---|---|---|---|
| 7,143,091 B2 * | 11/2006 | Charnock et al. ..................... 1/1 |
| 7,945,854 B2 * | 5/2011 | Medynskiy et al. .......... 715/243 |
| 2002/0156760 A1 * | 10/2002 | Lawrence et al. .................. 707/1 |
| 2005/0198026 A1 * | 9/2005 | Dehlinger et al. ................. 707/5 |
| 2006/0149720 A1 * | 7/2006 | Dehlinger ......................... 707/3 |
| 2006/0210157 A1 * | 9/2006 | Agnihotri et al. .............. 382/173 |
| 2006/0218492 A1 * | 9/2006 | Andrade ......................... 715/523 |
| 2006/0248440 A1 * | 11/2006 | Rhoads et al. ................. 715/500 |
| 2006/0259475 A1 * | 11/2006 | Dehlinger ......................... 707/3 |
| 2010/0005388 A1 * | 1/2010 | Haschart et al. .............. 715/256 |

* cited by examiner

*Primary Examiner* — Doug Hutton
*Assistant Examiner* — Soumya Dasgupta

(57) ABSTRACT

A citation record extraction system is provided for extracting citation records from publication list pages having different layouts and contents. An HTML rendering engine receives a publication list web page, parses the publication list web page to obtain layout information of the web page. A web page sequence builder generates a web page characteristic sequence for the web page according to the layout information. A web page repeated pattern analyzer analyzes repeated patterns presented in the web page characteristic sequence, screens out non-citation records therefrom, and obtains a citation record of the publication list web page.

13 Claims, 4 Drawing Sheets

CITATION RECORD EXTRACTION SYSTEM AND METHOD

CROSS REFERENCE TO RELATED APPLICATIONS

This application claims priority of Taiwan Patent Application Ser. No. 098126042, filed Aug. 8, 2009. The contents of the application are hereby incorporated by reference.

BACKGROUND

The invention relates to computer systems and methods, and in particular to citation record extraction system and method, and program product.

This section is intended to introduce the reader to various aspects of the art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read given said understanding, and not as admissions of prior art.

Citation records are essential to research communities. Researchers usually create their own publication lists on the Web for various reasons, such as describing their researches and contributions, or announcing their new papers before they are formally published on journals or conferences. Here, a Web page containing publication information is referred to as a publication list page. The challenges of extracting citation records from publication list pages arise from two aspects. First, many publication list pages are crafted manually by researchers themselves such that the layouts could be quite different. In addition, in most cases, the citation records usually accompany with some unrelated data, such as descriptive text related to the corresponding citation record. These noises become a great obstacle for extracting citation records. Second, there are many rules and formats for the representation of citation record, thus it is difficult to derive parsing rules for extracting citation record directly.

Accordingly, an effective processing method for citation record extraction is needed.

SUMMARY

Certain aspects commensurate in scope with the claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

A citation record extraction system is provided. An HTML rendering engine receives a publication list web page, parses the publication list web page to obtain layout information of the web page. A web page sequence builder generates a web page characteristic sequence for the web page according to the layout information. A web page repeated pattern analyzer analyzes repeated pattern presented in the web page characteristic sequence, screens out non-citation record therefrom, and obtains a citation record of the publication list web page.

A citation record extraction method is provided. The method comprises the steps of: receiving a publication list web page; parsing the publication list web page to obtain layout information of the web page; generating a web page characteristic sequence for the web page according to the layout information; and analyzing repeated pattern presented in the web page characteristic sequence, screening out non-citation record therefrom, and obtaining a citation record of the publication list web page.

The method of the present invention, or certain aspects or portions thereof, may take the form of program code (i.e. instructions) embodied in a tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

BRIEF DESCRIPTION OF DRAWINGS

The invention can be more fully understood by reading the subsequent detailed description and examples with references made to the accompanying drawings, wherein.

DETAILED DESCRIPTION

One or more specific embodiments of the invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacturing for those with ordinary skill in the art having the benefit of this disclosure.

In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense. The leading digit(s) of reference numbers appearing in the figures corresponds to the Figure number, with the exception that the same reference number is used throughout to refer to an identical component which appears in multiple Figures. It should be understood that many of the elements described and illustrated throughout the specification are functional in nature and may be embodied in one or more physical entities or may take other forms beyond those described or depicted.

Figure 1:
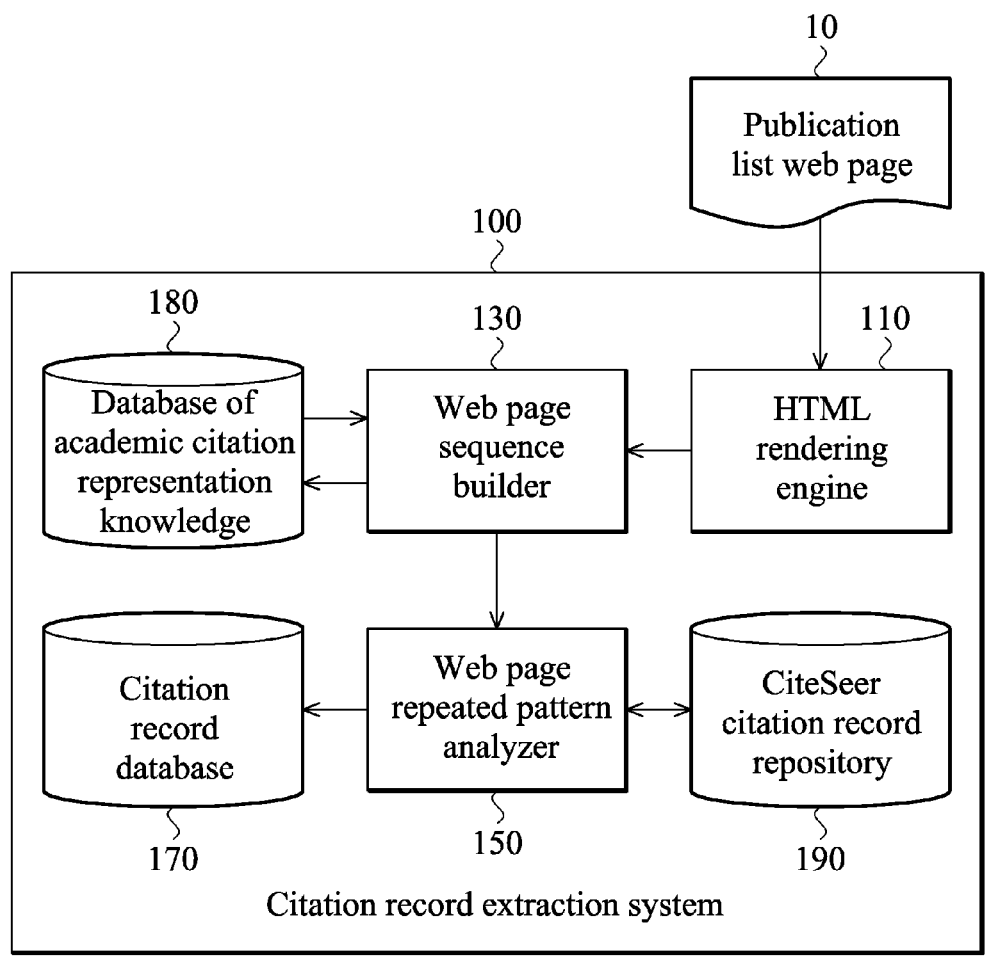
FIG. 1 is a schematic view of an embodiment of a citation record extraction system.

FIG. 1 is a schematic view of an embodiment of a citation record extraction system.

As shown in FIG. 1, the citation record extraction system 100 comprises: an HTML rendering engine 110, a web page sequence builder 130, a web page repeated pattern analyzer 150, a citation record database 170, a database of academic citation representation knowledge 180, and a CiteSeer citation record repository 190.

The HTML rendering engine 110 receives a publication list web page 10 from a Publication List Finding (PLF) system, and parses the publication list web page 10 to obtain layout information of the publication list web page 10.

The web page sequence builder 130 receives the layout information generated by the HTML rendering engine 110, and presents the publication list web page 10 by a characteristic sequence of symbols according to the layout information. Thus the framework of the publication list web page 10 is clarified.

Figure 2:
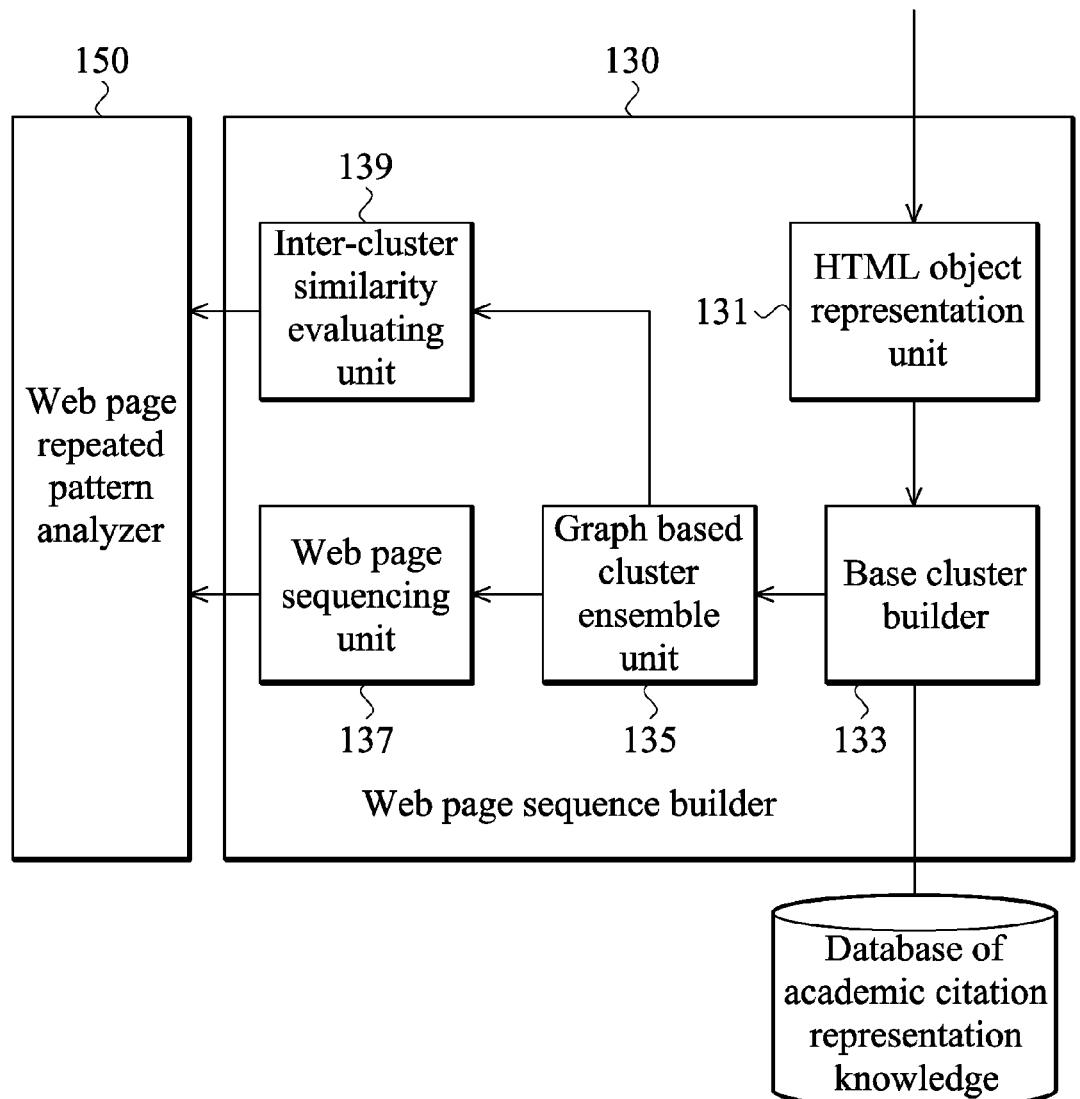
FIG. 2 is a schematic view of web page sequence builder illustrated in FIG. 1.

FIG. 2 is a schematic view of web page sequence builder illustrated in FIG. 1.

The web page sequence builder 130 comprises an HTML object representation unit 131, a base cluster builder 133, a graph based cluster ensemble unit 135, a web page sequencing unit 137, and an inter-cluster similarity evaluating unit 139.

The HTML object representation unit 131 receives the layout information obtained by the HTML rendering engine 110, and represents objects of the publication list web page by a plurality of attributes obtained from the layout information.

The base cluster builder 133 refers to the database of academic citation representation knowledge 180, and establishes a plurality of domain clusters by clustering similar webpage feature vectors into a cluster according to the attributes.

The graph based cluster ensemble unit 135 receives the objects clustered by the base cluster builder 133, and integrates clustering results of domain clusters.

The web page sequencing unit 137 organizes characteristic in the publication list web page into a sequence layout according to a result obtained from the integration. Here, each pattern generated by the web page sequencing unit represents an object, and objects organized as a group have an identical pattern.

The inter-cluster similarity evaluating unit 139 measures a connectivity degree between two of the clusters according to the integration result of domain clusters. Here, the connectivity degree is utilized by the web page repeated pattern analyzer 150 as an indicator to generate an alignment score matrix.

The web page repeated pattern analyzer 150 receives the characteristic sequence generated by the web page sequence builder 130, analyzes repeated pattern presented in the characteristic sequence, screens out non-citation records from the publication list web page, and retrieves a citation record of the publication list web page.

Figure 3:
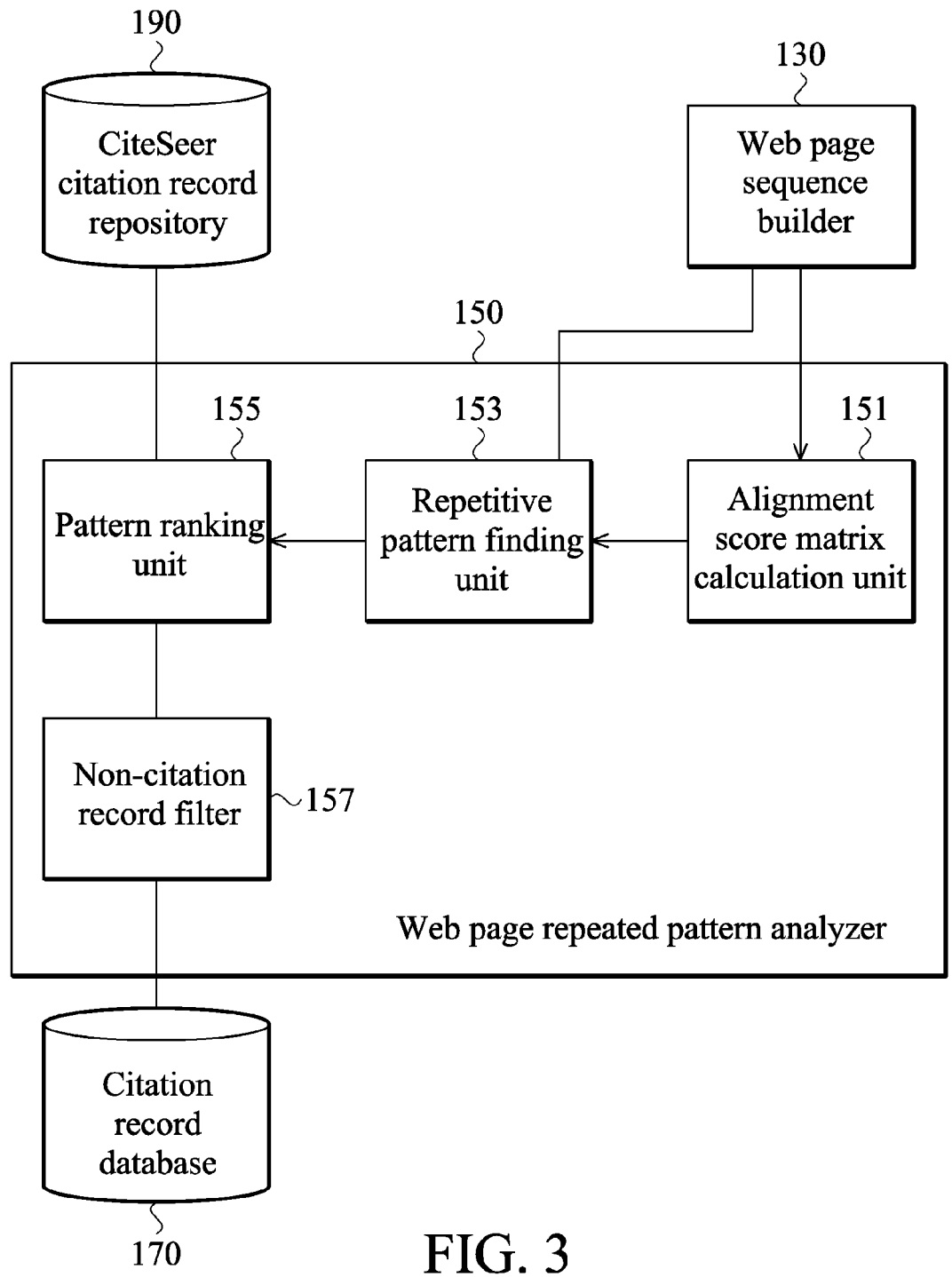
FIG. 3 is a schematic view of web page repeated pattern analyzer illustrated in FIG. 1.

FIG. 3 is a schematic view of web page repeated pattern analyzer illustrated in FIG. 1.

The web page repeated pattern analyzer 150 comprises an alignment score matrix calculation unit 151, a repetitive pattern finding unit 153, a pattern ranking unit 155, and a non-citation record filter 157.

The alignment score matrix calculation unit 151 receives the connectivity degree measured by the inter-cluster similarity evaluating unit 139, and generates a score matrix indicating costs of substitution, matching, and gap creation accordingly.

The repetitive pattern finding unit 153 receives the characteristic sequence generating by the web page sequencing unit 137, and finds a pattern that occurs repetitively in the publication list web page 10.

The pattern ranking unit 155 using the repetitive pattern to check the CiteSeer citation record repository 190, in order to determine whether it is a citation record according to the repetitive pattern, assigns a score to each of the patterns according to text characteristic of citation records, and selects patterns having highest scores. The patterns having the highest scores are regarded as the extracted citation records.

The non-citation record filter 157 ranks a new record with verified citation records, wherein the records with higher rank is regarded as verified. The non-citation record filter 157 further determines whether the new record is a real citation record, and retrieves the real citation records from the publication list web page.

Figure 4:
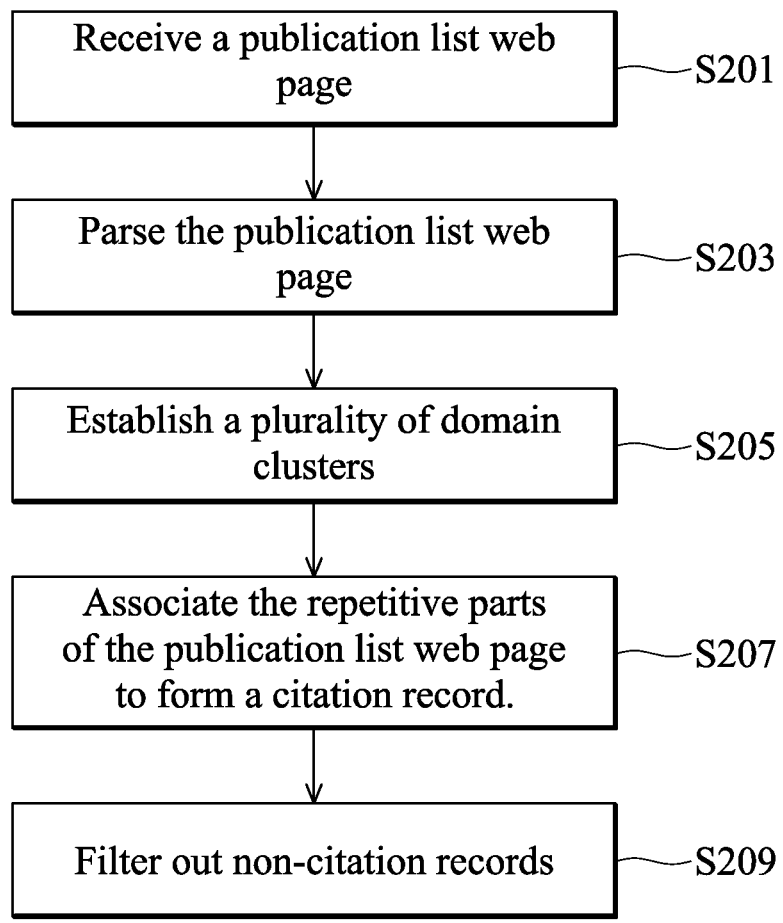
FIG. 4 is a flowchart of an embodiment of the citation record extraction method.

FIG. 4 is a flowchart of an embodiment of the citation record extraction method.

In step S201, a publication list web page is received.

In step S203, the publication list web page is parsed to obtain layout information of the web page. More specifically, the publication list web page is presented by a characteristic sequence of symbols according to the layout information. Thus the framework of the publication list web page is clarified.

In step S205, a plurality of domain clusters are established by clustering similar webpage attribute vectors into a cluster according to the attributes.

In step S207, the repetitive parts of the publication list web page are associated to form a citation record.

In step S209, non-citation records are filtered out from the citation record obtained in step S207.

As described above, an effective citation record extraction is provided.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A citation record extraction method, comprising:
receiving a publication list web page; parsing the publication list web page to obtain layout information of the web page;
generating a web page characteristic sequence for the web page according to the layout information;
analyzing repeated patterns presented in the web page characteristic sequence, screening out non-citation records, and obtaining a citation record of the publication list web page;
receiving the connectivity degree measured by the inter-cluster similarity evaluating unit, and generating a score matrix indicating costs of substitution, matching, and gap creation accordingly;
receiving the characteristic sequence generated by the web page sequencing unit, and
finding a pattern that occurs repetitively in the publication list web page; determining whether it is a citation record according to the repetitive pattern, assigning a score to each of the patterns according to text features of citation records, and selecting patterns having highest scores; and ranking a new record with correct citation records, determining whether the new record is correct, and retrieving citation records from the publication list web page.

2. The citation record extraction method of claim 1, further comprising:

representing objects of the publication list web page by a plurality of attributes obtained from the layout information;

establishing a plurality of domain clusters by clustering similar webpage attribute vectors into a cluster according to the attributes;

integrating clustering results of domain clusters;

organizing characteristics in the publication list web page into a characteristic sequence according to the result obtained from the integration; and measuring the connectivity degree between two of the clusters according to the integration result of domain clusters.

3. The citation record extraction method of claim 2, wherein each symbol generated by the web page sequencing unit represents an instance, and instances organized as a group have an identical symbol.

4. The citation record extraction method of claim 1, inquiring a citation record database based on the repetitive pattern in order to determine whether the record is the citation record.

5. The citation record extraction method of claim 1, further storing the citation record in a citation record database.

6. A citation record extraction system, comprising:

a processor;

an HTML rendering engine, receiving a publication list web page, and parsing the publication list web page to obtain layout information of the publication list web page;

a web page sequence builder, generating a characteristic sequence of symbols for the publication list web page according to the layout information; and a web page repeated pattern analyzer, analyzing repeated patterns presented in the characteristic sequence, screening out non-citation records from the publication list web page, and retrieving a citation record of the publication list web page, wherein the web page repeated pattern analyzer comprises:

an alignment score matrix calculation unit, receiving the connectivity degree measured by the inter-cluster similarity evaluating unit, and generating a score matrix indicating costs of substitution, matching, and gap creation accordingly;

a repetitive pattern finding unit, receiving the characteristic sequence generated by the web page sequencing unit, and finding a pattern that occurs repetitively in the publication list web page;

a pattern ranking unit, determining whether it is a citation record according to the repetitive pattern, assigning a score to each of the patterns according to text characteristics of citation records, and selecting patterns having highest scores; and a non-citation record filter, ranking a new record with verified citation records, determining whether the new record is a real citation record, and retrieving the real citation records from the publication list web page.

7. The citation record extraction system of claim 6, wherein the web page sequence builder further comprises:

an HTML object representation unit, representing objects of the publication list web page by a plurality of attributes obtained from the layout information;

a base cluster builder, establishing a plurality of domain clusters by clustering similar webpage feature vectors into a cluster according to the attributes;

a graph based cluster ensemble unit, integrating clustering results of domain clusters;

a web page sequencing unit, organizing characteristic in the publication list web page into a sequence of pattern according to a result obtained from the integration; and an inter-cluster similarity evaluating unit, measuring a connectivity degree between two of the clusters according to the integration result of domain clusters.

8. The citation record extraction system of claim 7, wherein each pattern generated by the web page sequencing unit represents an object, and objects organized as a group have an identical pattern.

9. The citation record extraction system of claim 6, wherein the pattern ranking unit inquiring a citation record database based on the repetitive pattern in order to determine whether the record is the citation record.

10. The citation record extraction system of claim 6, further comprising a citation record database to store the citation record.

11. A non-transitory computer readable storage medium for storing a computer program providing a citation record extracting method, the method comprising:

receiving a publication list web page;

parsing the publication list web page to obtain layout information of the web page;

generating a web page characteristic sequence for the web page according to the layout information; and analyzing repeated patterns presented in the web page characteristic sequence, screening out non-citation records therefrom, and obtaining a citation record of the publication list web page;

receiving the connectivity degree measured by the inter-cluster similarity evaluating unit, and generating a score matrix indicating the costs of substitution, matching, and gap creation accordingly;

receiving the characteristic sequence generated by the web page sequencing unit, and finding a pattern that occurs repetitively in the publication list web page;

determining whether it is a citation record according to the repetitive pattern, assigning a score to each of the patterns according to text features of citation records, and selecting patterns having highest scores; and ranking a new record with correct citation records, determining whether the new record is correct, and retrieving citation records from the publication list web page.

12. The non-transitory computer readable storage medium of claim 11, wherein the method further comprises:

representing objects of the publication list web page by a plurality of attributes obtained from the layout information;

establishing a plurality of domain clusters by clustering similar webpage feature vectors into a cluster according to the attributes;

integrating clustered results of domain clusters;

organizing features in the publication list web page into a characteristic sequence according to a result obtained from the integration; and measuring the connectivity degree between two of the clusters according to the integration result of domain clusters.

13. The non-transitory computer readable storage medium of claim 11, wherein the method of inquiring into a citation record database based on the repetitive pattern in order to determine whether the record is the citation record.

\* \* \* \* \*